J. H. HALL.
DISTRIBUTION SYSTEM.
APPLICATION FILED OCT. 2, 1911.
1,069,780.
Patented Aug. 12, 1913.
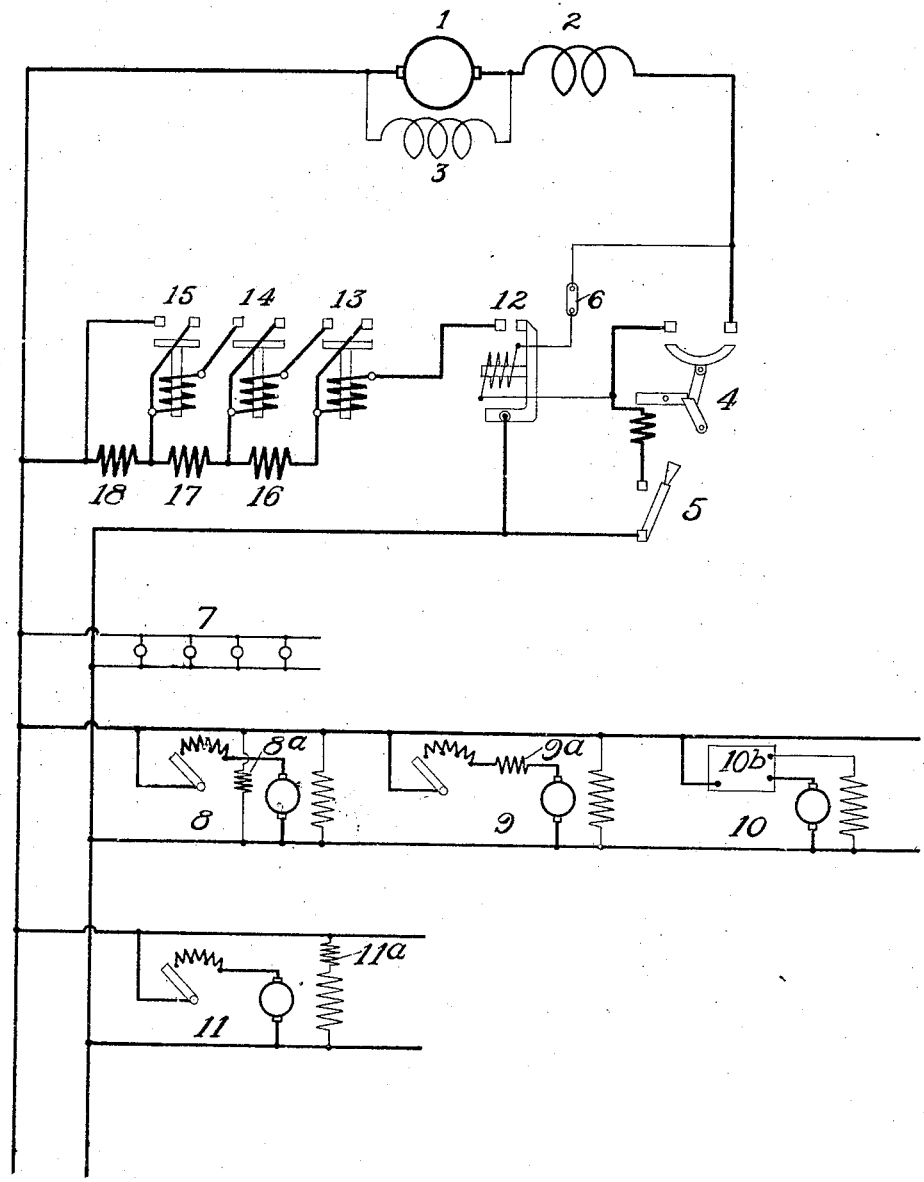
WITNESSES
INVENTOR
Jay H. Hall
BY
F. N. Barber
ATTORNEY

UNITED STATES PATENT OFFICE.

JAY H. HALL, OF CLEVELAND, OHIO, ASSIGNOR TO THE ELECTRIC CONTROLLER AND MANUFACTURING COMPANY, OF CLEVELAND, OHIO, A CORPORATION OF OHIO.

DISTRIBUTION SYSTEM.

1,069,780.

Specification of Letters Patent.   Patented Aug. 12, 1913.

Application filed October 2, 1911.   Serial No. 652,236.

*To all whom it may concern:*

Be it known that I, JAY H. HALL, a citizen of the United States, residing at Cleveland, in the county of Cuyahoga and State of Ohio, have invented new and useful Improvements in Distribution Systems, of which the following is a specification.

In industrial plants where a large number of motors are operating from one general system of distribution, the opening of the power house circuit breaker cuts off the source of supply from all the motors and operations must cease until all the motors have stopped, the circuit breaker has closed, and the motors have restarted.

Nearly all shunt-wound motors have starting devices which are held in the position of least resistance in the motor circuit until the voltage on the line becomes very low. Since the motor fields are connected in shunt with their respective armatures, the motors will generate current, due to the fly-wheel effect of the machines they have been driving, and return power to the system. For this reason some motors having a heavy fly-wheel effect will maintain the voltage on the line for a considerable time and the switchboard operator at the power house must, therefore, wait some three or four minutes before resetting the circuit breaker. He must arbitrarily set a time long enough for the longest running motor to practically stop, or run the danger of closing the circuit with one or more motors connected directly across the supply mains with no resistance in the armature circuits and the motors running at a very slow speed. When frequent operations of the circuit-breaker occur, a great loss in time is occasioned from waiting for the motors to come to rest.

One of the objects of my invention is to cause all the motors in a system to slow down as quickly as possible after the opening of a circuit breaker in the supply main from which they are energized.

Another object is to give an indication to the switchboard attendant that the motors have stopped, that he may know when to reset the circuit breaker.

To describe my invention more in detail, I will refer to the accompanying drawing, which is a wiring diagram showing a system of distribution supplying power for light, motors and other translating devices.

In the drawing the source of supply is shown as a generator with the armature 1, the series field 2, and the shunt field 3. It will be understood that a battery or other source could be substituted for the generator, if so desired. The overload circuit breaker at the power house is shown at 4 and the main line switch at 5. The system is shown supplying the group of lamps 7, the group of motors 8, 9, and 10, and the motor 11. The motor 8 is shown as a shunt wound motor with a simple starting rheostat and the winding 8ª connected across the supply mains for holding the rheostat in the full running position, which is the position of least resistance in the armature circuit. The motor 9 and its starter are similar to the motor 8 except that the holding winding 9ª is shown connected in series with the armature. Motor 10 is shown as connected to any of the well-known automatic starters, shown diagrammatically at 10ᵇ, nearly all of which starters have some means of holding the starter in the position of least resistance for running. If any of the well known hand-operated controllers are used, such as for machine tools, it is usual to depend upon the operator to return the controller to the off position in case of a failure of voltage on the supply mains. The motor 11 has a starter with the holding winding 11ª connected in the circuit of the shunt field. Any one of the motors may be assumed to have the greatest fly-wheel effect, such as for instance the motor 11.

I have not shown the customary knife switches, fuses, etc., that are put in for convenience at any part of the system.

Located preferably near the circuit breaker 4 and the main switch 5, I show the controller for stopping the motors when the circuit breaker opens due to either an overload or an underload. This device consists of the switches 12, 13, 14 and 15, and the resistances 16, 17, 18. The switch 12 has an operating winding of high resistance which becomes energized upon the opening of the circuit breaker 4. This is accomplished in the arrangement shown by connecting the winding to the terminals of the circuit breaker. When the circuit breaker is closed the winding is short-circuited, and as soon as the circuit breaker opens the winding is subjected to approximately full line voltage, causing the switch 12 to close. This places a shunt across the supply mains on the motor side of the circuit breaker including the resistances 16, 17, 18. The switches 13, 14, 15 have their windings adapted to be connected in the circuit to be controlled, and arranged to cause the closure of the switches in automatic progression. Each of these switches is of the type of switch described in H. R. Canfield's applications, Serial Number 583,000, filed September 21, 1910, and Serial Number 604,331, filed January 23, 1911, and in Eastwood's Patent, No. 1,040,292, granted October 8, 1912. In these applications and in this patent, particularly in Fig. 2, the switches have the peculiar characteristic of remaining open when the winding is excited above a certain predetermined value, and will operate to close its contacts when the current in the winding is reduced.

The shunt which is connected across the supply mains by the switch 12 includes also the winding of the switch 13, and current, supplied from the motors in the system which are being driven by the momentum of the machines they have been driving, will flow through this shunt. This produces a dynamic braking effect which slows down the motors and thereby reduces the voltage generated by them. Assume that at the instant of closure of the switch 12 the current supplied to the resistances, 16, 17, 18, and the winding of the switch 13 is sufficient to lock the switch 13 open. The current will gradually decrease as the motors slow down until it reaches a certain value at which the switch 13 will operate, whereupon it will close its contacts, short-circuit the resistance 16 and energize the winding of the switch 14. The cutting out of the resistance 16 increases the current generated by the motors in the system increasing their retardation. This current flowing through the winding of the switch 14 locks the switch open until it decreases due to the slowing down of the motors until the value is reached which will operate the switch 14, whereupon the switch 14 will close, short-circuit the resistance 17, and energize the winding of the switch 15. The current generated by the motors is again raised by the cutting out of the resistance 17, and their retardation is further increased. In like manner the switch 15 will close when the current in its winding has decreased to the proper value, thus short-circuiting the remaining resistance 18 and leaving in circuit only the windings of the switches 13, 14, 15. The motors which are practically in a short circuit are quickly brought to a standstill or cut off the line by their respective controlling devices. As soon as the current ceases the windings of the switches 13, 14, 15, become deënergized and these switches fall open, thereby indicating to the switchboard attendant that he may reset the circuit breaker. The attendant then opens the main switch 5, whereupon the winding of the switch 12 is deënergized and the switch 12 opens. The circuit breaker 4 and the main switch 5 are then closed. The closure of the circuit breaker short-circuits the winding of the switch 12, thereby preventing the closure of the switch 12 until the circuit breaker again opens.

I have shown but one set of supply mains leading from the terminals of the generator, but it will be understood that any number can be connected thereto, each supplied with a circuit breaker and a slowing-down device for the motors in that circuit. A small switch 6 can be inserted in the circuit of the winding of the switch 12, by which the attendant can open the switch 12 before he resets the circuit breaker, whereby the switch 5 may remain closed or be omitted.

The number of retardation switches, of which I have shown but three, can be increased or diminished as the conditions warrant, and other methods of controlling the switch 12 can be used to cause it to close on the opening of the circuit breaker, without departing from the spirit of my invention. Any of the well known systems of retardation can also be substituted in place of the switches 13, 14, 15 here shown. A manually operated device could be used if so desired. My invention can also be used to quickly slow down a group of motors in case of accident, or any other emergency, by providing a circuit breaker of any of the well known types which can be opened at will either by hand or from a distance.

I claim—

1. A system of distribution, a source of supply therefor, a plurality of motors, means connecting said motors to the system, means for independently controlling the current in each motor, and means for simultaneously controlling the current generated by all the motors when the said system is disconnected from the source.

2. The combination of a system of distribution, a source of supply, a plurality of motors, means independently connecting each motor to the system, a circuit breaker for disconnecting the system from the source, and a switch for closing a circuit including the said connecting means and the motors when the said circuit breaker opens.

3. The combination of a generator of electricity, a pair of conductors leading therefrom, a circuit breaker for connecting said generator to the conductors, a plurality of motors connected to said conductors, a controller for each motor, and an automatic slowdown device which operates independently of said motor controllers to control the current generated by said motors when the said circuit breaker opens.

4. The combination of a system of distribution, a source of energy therefor, a plurality of motors supplied from said system, a controller for each motor, and a slowdown device for all of the motors operating independently of said motor controllers to regulate the current generated by said motors when the source is disconnected from said system.

5. In a system of distribution, a source of supply, a plurality of motors, a switch connecting each motor to the system, and means, when the system is disconnected from the said source, for closing a circuit into which current generated by the said motors may flow, said current from each motor passing through the said switch connecting it to the system.

6. The combination with a system of distribution, a source of supply therefor, a plurality of motors, and means for independently connecting each motor to said system, of a switch for connecting a resistance to said system so as to control the current generated by all the motors passing through the said connecting means.

7. The combination with a system of distribution, a source of supply therefor, a plurality of motors, and means for independently connecting each motor to said system, of a switch for connecting a resistance to said system so as to control the current generated by all the motors passing through the said connecting means, and means for closing said switch when the system is disconnected from the said source.

8. The combination of a system of distribution, a source of supply, a plurality of motors, means connecting each motor to the system, a switch for disconnecting the system from the source and means automatically operated, when said switch opens, for connecting a resistance to the system through which may flow the current generated by the said motors.

9. The combination of a system of distribution, a source of supply, a plurality of motors, means connecting each motor to the system, a switch for disconnecting the system from the source, means automatically operated, when said switch opens, for connecting a resistance to the system through which may flow the current generated by the said motors, and means for automatically decreasing said resistance.

10. The combination of a system of distribution, a source of supply, a plurality of motors, means connecting each motor to the system, a switch for disconnecting the system from the source, means automatically operated, when said switch opens, for connecting a resistance to the system through which may flow the current generated by the said motors, and means for cutting out portions of said resistance as the motors slow down.

Signed at Cleveland, Ohio, this 29th day of September, 1911.

JAY H. HALL.

Witnesses:
R. H. BENNETT,
H. M. DIEMER.

Copies of this patent may be obtained for five cents each, by addressing the "Commissioner of Patents, Washington, D. C."